United States Patent Office 3,758,490
Patented Sept. 11, 1973

3,758,490
PERFLUOROALKYLSULFONAMIDOBENZO-
THIAZOLES
Joseph Kenneth Harrington, Edina, Donald C. Kvam, North Oaks, Arthur Mendel, Vadnais Heights, and Jerry E. Robertson, North Oaks, Minn., assignors to Minnesota Mining and Manufacturing Company, St. Paul, Minn.
No Drawing. Application June 30, 1969, Ser. No. 837,900, now Patent No. 3,642,817, which is a continuation-in-part of abandoned application Ser. No. 588,338, Oct. 21, 1966. Divided and this application May 11, 1971, Ser. No. 142,379
Int. Cl. C07d 91/46
U.S. Cl. 260—305                                        2 Claims

ABSTRACT OF THE DISCLOSURE

N-substituted perfluoroalkanesulfonamides in which the sulfonamide nitrogen substituent is benzothiazolyl, i.e. perfluoroalkylsulfonamidobenzothiazoles. Also included are processes for the preparation and use of said compounds. The compounds are active as anti-microbial agents and polymerization catalysts.

---

This application is a division of copending application Ser. No. 837,900 filed June 30, 1969, now U.S. Pat. 3,642,-817, which is, in turn, a continuation-in-part of the earlier application Ser. No. 588,338 filed Oct. 21, 1966, now abandoned.

The invention relates to perfluoroalkanesulfonamides N-substituted by a benzothiazolyl group. These compounds have activity as anti-microbial agents and polymerization catalysts. The invention also includes processes for the preparation and use of the compounds.

DETAILED DESCRIPTION

According to the present invention, there is provided a class of compounds consisting of compounds having the general formula:

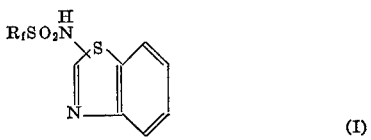

(I)

wherein $R_f$ is a perfluoroalkyl group containing one to four carbon atoms.

Due to the acidity of the hydrogen of the sulfonamido group of Formula I, the compounds of the invention are catalysts for certain acid-catalyzed polymerizations, e.g. epoxide polymerizations. The compounds of the invention are anti-microbial agents, according to standard test procedures.

Preferably $R_f$ in the compounds of the invention is trifluoromethyl. Such compounds offer more efficient utilization of fluorine, since compounds containing longer fluorinated chains are more expensive but do not offer any substantial increase in anti-microbial effectiveness.

The anti-microbial activity was determined by a standard test procedure which is a variation of the original agar-plate diffusion method of Vincent and Vincent.

Leading references to the method used are: Vincent, J. G., and Vincent, Helen W., Proc. Soc. Exptl. Biol. Med. 55: 162–164, 1944, and Davis, B. D., and Mingioli, E. S., Jour. Bact. 66:129–136, 1953.

Broadly speaking, the compounds of this invention are readily prepared by one or all of the following methods, each of which is illustrated by an equation.

Method A

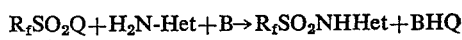

where Q is a halogen or perfluoroalkanesulfonate residue, B is an organic or inorganic base which acts as an acid acceptor, Het is the benzothiazolyl moiety and $R_f$ is as defined above.

A solution of the appropriate primary amine and an equimolar quantity of a suitable acid acceptor (such as triethylamine, dimethylaniline, pyridine and the like) in an inert organic solvent is ordinarily used. However, an acid acceptor is not always necessary, and an excess of the primary amine may also serve as acid acceptor. Among the suitable solvents are 1,2-dimethoxyethane, benzene, chloroform, dichloromethane, dimethylacetamide, dimethylformamide and the like. Alternatively, an excess of the primary amine or the acid acceptor may serve as a solvent, or the reaction may be carried out in the absence of solvent. Generally, an equimolar quantity of the appropriate perfluoroalkanesulfonic anhydride or halide is added to the solution. The addition is advantageously carried out at −15° C. to 100° C., and for some reactants higher or lower temperatures may be preferable. In cases where the amine is of lower reactivity, it is advantageous to allow the reaction mixture to remain at reflux temperature for a few hours following addition.

The reaction of Method A may also be carried out in a high pressure reactor. This technique is particularly preferred when perfluoroalkanesulfonyl fluorides are used as reactants. These reactions are usually carried out at temperature ranges of 0 to 150° C., but these temperature ranges may be raised or lowered, depending upon the reactants used. Such reactions are most frequently carried out without solvent, or with dimethylformamide or excess triethylamine as solvent, but other advantageous variations are possible.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

Method B

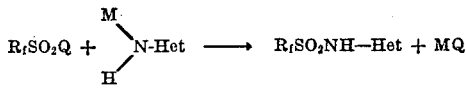

where M is an alkali metal and Q, $R_f$ and Het are as defined above.

An alkali metal salt of the appropriate amine is prepared by any of several conventional methods such as by reaction with sodium naphthalene, a metal hydride such as sodium hydride, alkoxides such as potassium t-butoxide in protic or aprotic solvents, or by reaction with an alkali metal such as sodium or potassium directly in an appropriate solvent.

The resulting salt is then treated with a perfluoroalkanesulfonyl alkylating agent such as trifluoromethane sulfonyl fluoride or chloride or trifluoromethanesulfonic anhydride, either at atmospheric pressure in open apparatus or under pressure in a pressure vessel. The reaction takes place at 0° to 150° C., depending on the reactivity of the amine and the sulfonyl halide. On completion of the reaction, the product is obtained by conventional work-up techniques as described in Method A.

Method C $$R_fSO_2NHZ + X\text{-Het} \rightarrow R_fSO_2NH\text{-Het} + ZX$$

Formula II $R_f$ and Het are as defined above, X is halogen and Z is an alkaline earth or alkali metal. The perfluoroalkanesulfonamide salt and an appropriate halide of Formula II are reacted, generally in a suitable solvent (such as dimethylsulfoxide, dimethylformamide, 1,2-dimethoxyethane, dimethylacetamide and the like). Heating or cooling, usually the former, may be advantageous to obtain a desirable rate of reaction.

After the completion of the reaction, the product is isolated by conventional methods. For example, when the reaction mixture is diluted with water the product may precipitate. Alternatively, the product may be extracted from the reaction mixure after dilution with water. Other recovery techniques are well known to those skilled in the art.

The reaction of Method C may also be carried out in a high pressure reactor.

Method C is usually most valuable when the halide is activated by suitable electron-withdrawing groups on the ring. Suitable halides for use in Method C are well known to the art, as are salts of perfluoroalkanesulfonamides.

Suitable perfluoroalkanesulfonyl anhydrides and halides (e.g. chlorides and fluorides) for use in these procedures are known to the art (thus see U.S. Pat. 2,732,398). Similarly, the amines used in producing the compounds of this invention are described in the general chemical literature or are otherwise known to those skilled in the art.

Methods A, B and C are generally applicable (preferably Method A) to the preparation of compounds of the invention. However, it is sometimes preferable, in order to increase yields and minimize purification problems, to prepare certain compounds of the invention from compounds already containing the perfluoroalkylsulfonamido group by conventional procedures.

The following example is given for the purpose of further illustrating the procedures of the present invention, but is not intended, in any way, to be limiting on the scope thereof. Thus, while the example relates to perfluoromethanesulfonamides, other perfluorocarbon groups can be substituted in place thereof.

EXAMPLE 2-aminobenzothiazole (37.5 g., 0.25 mole), triethylamine (25.3 g., 0.25 mole) and chloroform (250 ml.) were stirred under a nitrogen atmosphere while adding trifluoromethanesulfonic anhydride (70.5 g., 0.25 mole) slowly, the temperature being maintained below 40° C. After stirring at room temperature, the mixture was extracted with 10 percent sodium hydroxide solution. The layers were separated, and the water layer was washed with dichloromethane and acidified to pH 1 with concentrated hydrochloric acid. The solid product was collected by filtration and recrystallized twice from an ethanol-water mixture to give 2-trifluoromethylsulfonamidobenzothiazole, M.P. 253.5–255.5° C.

*Analysis.*—Calculated for $C_8H_5F_3N_2O_2S_2$ (percent): C, 34.1; H, 1.8. Found (percent): C, 34.3; H, 2.1.

What is claimed is:
1. A compound of the formula:

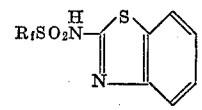

wherein $R_f$ is a perfluoroalkyl group containing one to four carbon atoms.

2. The compound 2-trifluoromethylsulfonamidobenzothiazole according to claim 1.

References Cited
UNITED STATES PATENTS 3,642,817    2/1972    Harrington et al. __ 260—306.8 R RICHARD J. GALLAGHER, Primary Examiner